(12) United States Patent
Crocker

(10) Patent No.: US 6,186,353 B1
(45) Date of Patent: Feb. 13, 2001

(54) BATTERY COVER CONNECTOR

(76) Inventor: Elizabeth P. Crocker, 3553 Corte Dolce, Carlsbad, CA (US) 92009

( * ) Notice: Under 35 U.S.C. 154(b), the term of this patent shall be extended for 0 days.

(21) Appl. No.: 09/296,448

(22) Filed: Apr. 21, 1999

Related U.S. Application Data

(60) Provisional application No. 60/082,525, filed on Apr. 21, 1998.

(51) Int. Cl.[7] .................................................. B65D 55/16
(52) U.S. Cl. ........................................ 220/375; 220/345.4
(58) Field of Search .......................... 439/135; 220/375, 220/345.4, 345.1; 429/96, 100; D13/103

(56) References Cited

U.S. PATENT DOCUMENTS

| 2,287,366 |   | 10/1941 | Younghusband. |
| 2,854,789 | * | 10/1958 | Berry. |
| 3,874,570 | * | 4/1975 | Katzman et al. ................... 220/375 |
| 4,134,635 | * | 1/1979 | Roche. |
| 4,194,657 |   | 3/1980 | Thor. |
| 4,327,960 | * | 5/1982 | Gould ................................... 220/375 |
| 4,339,056 |   | 7/1982 | Berkstresser, Jr. et al.. |
| 4,432,120 |   | 2/1984 | Sherman, Jr. et al.. |
| 4,611,714 |   | 9/1986 | Behrens. |
| 4,964,529 |   | 10/1990 | Houston. |
| 5,155,659 | * | 10/1992 | Kunert ................................ 220/375 |
| 5,307,511 | * | 4/1994 | Takahasi .......................... 220/345.4 |
| 5,722,705 | * | 3/1998 | Deguchi. |
| 5,931,513 | * | 8/1999 | Conti .................................... 429/100 |
| 6,007,941 | * | 12/1999 | Hermann et al. ..................... 429/96 |

FOREIGN PATENT DOCUMENTS 10-17008 * 1/1998 (JP).

* cited by examiner

Primary Examiner—Nathan J. Newhouse
(74) Attorney, Agent, or Firm—Knobbe, Martens, Olson & Bear, LLP

(57) ABSTRACT

A removable battery cover on an electrical device such as a toy or appliance is secured to the device with a tether. The tether may comprise a flexible elongated member with an adhesive connector attached to each end.

1 Claim, 3 Drawing Sheets

BATTERY COVER CONNECTOR

CROSS REFERENCE TO RELATED APPLICATIONS

This application claims priority under 35 U.S.C. § 119(e) to provisional patent application Ser. No. 60/082,525, filed on Apr. 21, 1998, and entitled "Battery Cover Connector." The disclosure of provisional patent application Ser. No. 60/082,525 is hereby incorporated by reference in its entirety.

BACKGROUND OF THE INVENTION

Many electronic appliances and toys require batteries. These batteries are typically contained in a cavity covered by a removable cover. Often the cover is needed to hold the batteries in place. If the cover is lost, batteries are not maintained in adequate contact with the appropriate electric terminals and power is lost to the appliance or toy rendering it useless. Further, if the cover is lost, batteries fall out and again power is lost to the appliance or toy. There is thus a need for a way to prevent loss of battery covers for such appliances and toys.

SUMMARY OF THE INVENTION

The present invention solves the problem of lost battery covers by providing a connection between the battery cover and the appliance so the cover is not lost. Preferably, a small lightweight connector is designed to have one end attached to the battery cover of an appliance or toy, with the opposing end attaching a housing or case of the appliance or toy. An adhesive may connect the ends to the cover and case.

DETAILED DESCRIPTION OF THE INVENTION

Figure 1:
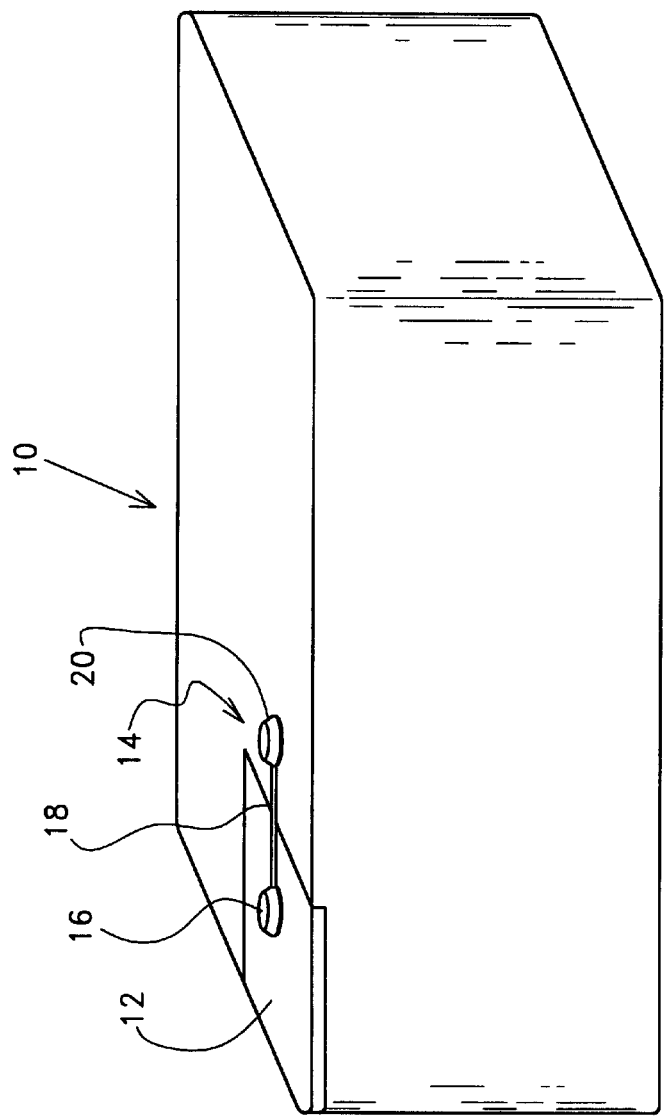
FIG. 1 is a perspective view of an electrical device with one embodiment of a connector of the invention attached thereto.
Figure 1:
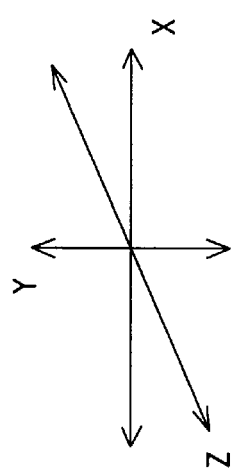
Figure 2:
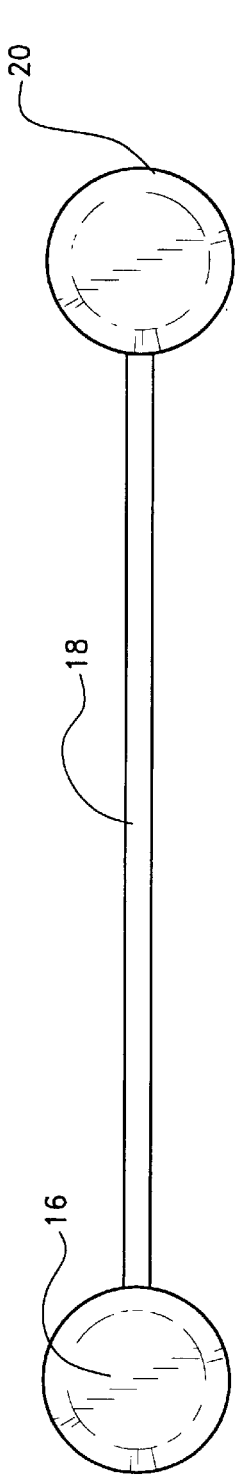
FIG. 2 is a top plan view of a connector of this invention.
Figure 3:
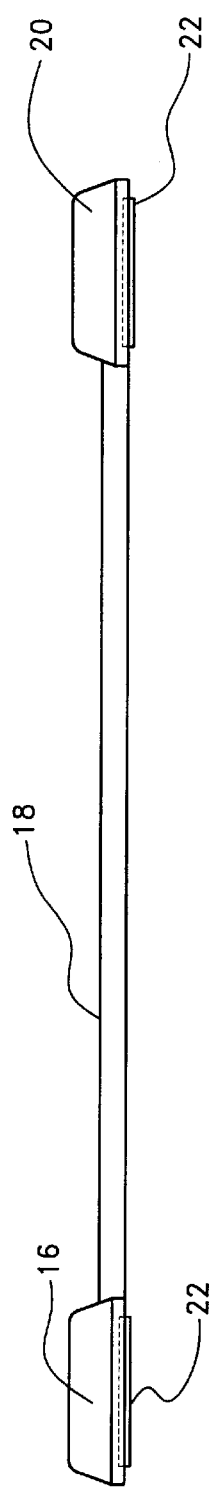
FIG. 3 is a side plan view of the connector of FIG. 2.
Figure 4:
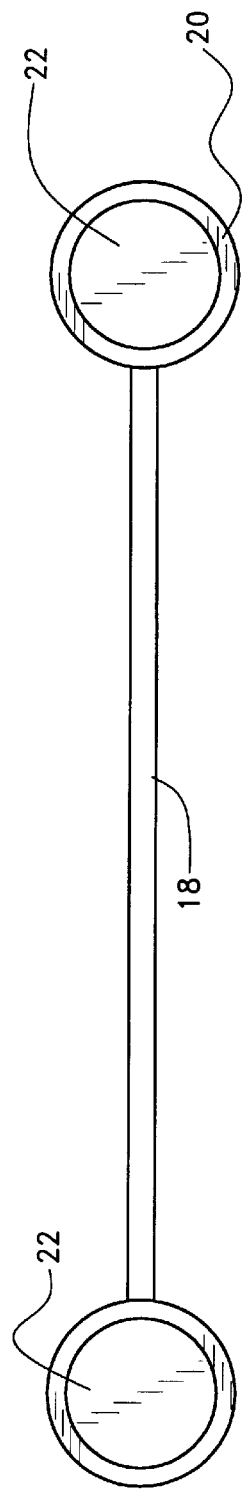
FIG. 4 is a bottom plan view of the connector of FIG. 2.

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Referring to FIGS. 1–4, a device 10 requires electrical power from batteries that are contained in a recess accessible by removable cover 12. The device 10 can comprise a camera, portable computer, radio, toy, electrical appliance or any other device requiring electrical power from batteries. A tether 14 has a first connector 16 connected to the battery cover and an opposing, second connector 20 connected to the device 10 with the connectors 16, 20 being joined by a flexible member of diverse shape, but which advantageously comprises an elongated member 18. Preferably the first connector 16 connects to the exterior of the battery cover 12 while the second connector 20 connects to the exterior of the housing of the device 10.

The length of the member 18 will vary as needed because battery covers 12 may fasten in different ways. Thus, some covers 12 may need to slide off and require much lateral movement relative to the device 10, while other covers 12 may snap off with little lateral movement relative to the device 10. The length of member 18 must accommodate the amount of motion needed to remove and reinstall the cover 12. A member 18 about 3 inches long is believed suitable. Shorter or longer members 18 may be utilized as the particular situation requires. The member 18 may be made out of flexible plastic, rubber, fabric or other material. Some elasticity of the material is advantageous in many applications. The member 18 and connectors 16, 20 may be made of polyvinylchloride (PVC), but urethane is preferred because it provides flexibility as well as some elasticity or stretch. One suitable example is Pellathane 2103-80E from Dow Chemical. Other plastic materials may also be suitable, depending on the exact properties desired. The connector could also be made of coiled cord, similar to a coiled telephone cord, to allow additional movement of member 18. The disadvantage of a coiled connector 18 is that it may protrude further from the surface of the device 10, and may be more easily caught on objects. Thus, a lower profile connector 18 is preferred, with the connector close to the device 10 and cover 12 to avoid inadvertently catching and pulling on the member 18.

Advantageously, the connector is colored to match the electrical appliance or toy to which the connector is fastened, although contrasting colors may also be used to make it easier to locate the battery cover.

The connectors 16, 20 may be of various shapes, but are preferably flat, circular portions joined to the member 18 in a way that reduces stress concentration and resists breakage of the connection between connectors 16, 20 and member 18. Advantageously, the connectors 16, 20 are as thin as possible while providing sufficient strength to avoid inadvertent removal during use of the device 10. Further, the exterior edges of the connectors 16, 20 are shaped to avoid catching fabric or other surfaces that may contact the edges. Thus, curved or rounded exterior edges are preferred.

The size of the connectors 16, 20 is selected to provide sufficient contact area with the battery cover 12 or device 10 so that the connectors 16, 20 will not be inadvertently removed during use of the device 10. Connectors 16, 20 of urethane about ⅛ (0.125) inch to 5/32 (0.156) inch thick and shaped as ½ inch diameter disks are believed suitable. Larger or smaller dimensions may be used as required.

Advantageously, the connectors 16, 20 are integrally formed with the intervening member 18. They may be simultaneously molded of a single piece of material, or cut from a single piece of material. The juncture of the member 18 with the connectors 16, 20 is advantageously such as to reduce stress risers that may increase the likelihood of cracking or breaking at the juncture. Thus, smooth, curved junctures are desirable.

The connectors 16, 20 may be fastened to the cover 12 or device 10 by various means, such as threaded fasteners, rivets, melting or welding, but are preferably fastened by an adhesive layer 22. Various industrial grade adhesives are suitable if the tether 14 is applied at the time a device 10 is manufactured. An adhesive with a peel off protective layer is suitable for use with a tether 14 that is applied after the device 10 is acquired by a user in an after-market application. Thus, the tether 14 may be acquired and attached to a pre-owned device 10 by peeling the protective tape off the adhesive 22, and fastening one connector 16 to the battery cover 16, and fastening the other connector 20 to the housing of device 10. Advantageously, the adhesive 22 is thin in order to maintain a low profile of the connectors 16, 20. However, it is beneficial for the adhesive to accommodate the texture of the parts of the device 10 to which it fastens yet still adhere adequately to perform its fastening function. It has been found advantageous to use double sided adhesive tape which is punched to form circular slabs of a suitable size. In one embodiment, the tape comprises type 7159 from Bron Tapes of San Diego, Calif. This material has adhesive on one side which is formulated to adhere to rubber, and adhesive on the other side which is formulated to adhere to a variety of surfaces such as plastic or metal.

If the device 10 has a metallic housing and cover 12, or if metallic inserts are added to predetermined locations of the housing and cover, then a magnet could be used on the connectors 16, 20.

Advantageously at least one of the connectors 16, 20 is fastened when the cover 12 is in a position most remote from the device 10. This remote positioning ensures sufficient length of member 18 may allow the battery cover 12 to be fastened to the device 10 after batteries are inserted in the device 10.

Figure 5:
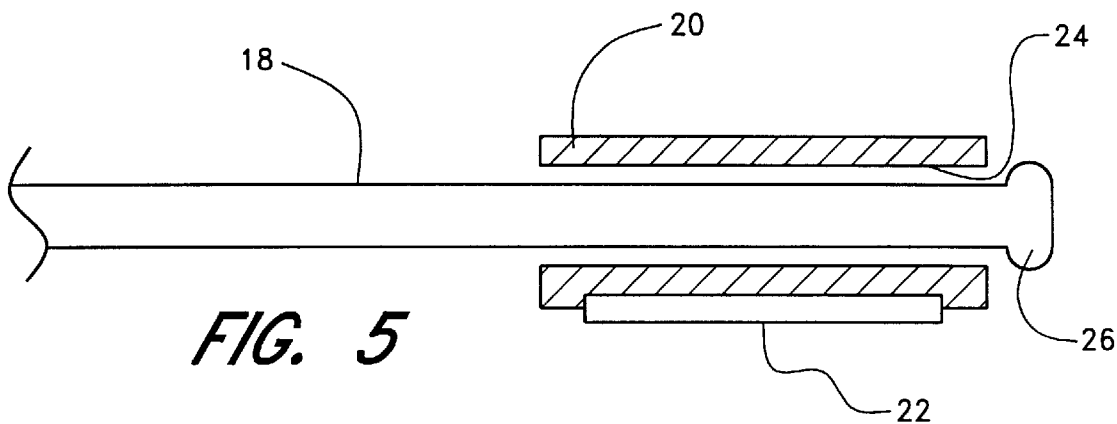
FIG. 5 is a cross sectional view of another embodiment of a portion of a battery cover connector.

If the member 18 is not elastic and if the cover 12 slides off the device 10, then the member 18 will not lay flat against the device 10 when the cover 12 is installed because the of the extra length of member 18 needed to allow movement of the cover 12. This extra length causes member 18 to bow with the resulting non-flatness subjecting member 18 to catching objects during the use of the device 10, and possibly breaking the member 18. As shown in FIG. 5, the member 18 could be formed to extend into cavities in the ends 16, 20 or extend slidably through holes 24 in the ends 16, 20—with an enlarged end 26 on member 18 preventing the member 18 from being separated completely from the ends 16, 20. But advantageously the member 18 is fixed relative to the ends 16, 20. By positioning the tether 14 so the member 18 lays perpendicular to the movement of the cover 12, this non-flatness can be reduced. Thus, if the cover 12 is removed by sliding it along the Z axis as shown in FIG. 1, then the bowing or non-flatness of member 18 is reduced by orienting the member 18 along the X axis as shown in FIG. 1. The non-flatness may be reduced by making the member 18 elastic, so that it stretches sufficiently to allow the cover 18 to be removed and reinstalled. The member 18 is preferably not strong enough to be used as a handle to carry the device 10, but may be designed sufficiently strong that it does not break if occasionally used to lift the device 10. For example, it is desirable that the member 18 not break immediately if the device 10 is inadvertently picked up by a detached battery cover 12, resulting in lifting the device 10 up off the ground by the tether 14. The elongation of a somewhat elastic member 18 prior to breaking could indicate to a user that possible damage to the device 10 may occur. Of course, a conservative approach is to design connectors 16, 20 member 18, and the adhesive 22, so that the device 10 can be picked up by cover 12 and member 18.

Figure 6:
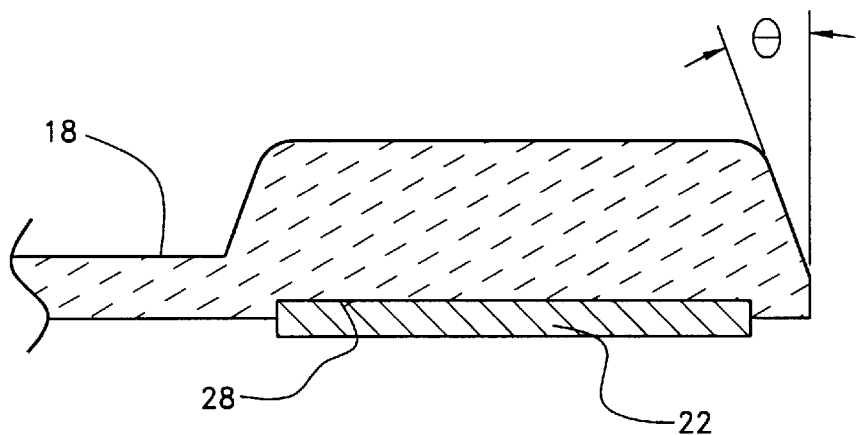
FIG. 6 is a cross sectional view of another embodiment of a portion of a battery cover connector.

Referring now to FIG. 6, an alternative embodiment is shown in which one or more of the connectors 16, 20 have a recess 28 in one surface, with the recess being sized to accommodate the adhesive 22. The recess 28 advantageously forms a slight lip around the edge of the adhesive for better resistance to forces in the plane of the connectors 16, 20 or adhesive 22. The recess 28 also provides a lower profile or height for the assembled connectors 16, 20, and adhesive 22 so the connectors are less likely to snag or catch on items. Advantageously, the recess 28 and adhesive 22 are approximately 0.4 inches in diameter, with the connectors 16, 20 being about 0.5 inches in diameter and about 0.15 inches high. In this embodiment, the member 18 coupling the connectors may be integrally formed with the connector, and may be about 0.07 inches thick. The recess may be approximately 0.015 inches deep, and the thickness of the adhesive may be approximately 0.03 to 0.08 inches thick so that a portion of the adhesive extends out from the bottom surface of the connector. It will be appreciated by those of skill in the art that a wide variety of dimensions may be used for the various tether elements while maintaining desirable results.

The outer periphery of the connectors 16, 20 may advantageously be angled or inclined at an angle $\theta$ varying from about 5 to about 30 degrees, with an angle of about 20 degrees being preferred, although other angles will be suitable depending on the application. This inclination helps avoid snagging the edges of connectors 16, 20 on items. The connectors 16, 20 advantageously have a flat top to maintain a low profile, which more advantageously includes a curved juncture with the inclined sides, wherein a radius of curvature of approximately 1/32 inches having been found suitable. The curved edges also help avoid catching the connectors 16, 20 and pulling them off the cover 12, or device 10.

The invention thus provides a tether or connector for connecting a battery cover to an appliance. The connector may be installed at the time of manufacture, or it may be applied after an appliance is acquired by a user.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A tethered connector for coupling a battery cover to an associated electrical device comprising:

a first connector having a recess with adhesive in the recess;

a second connector having a recess with adhesive in the recess;

a flexible and resilient member integrally formed with and connecting the first and second connectors, the connectors being configured to have a low profile with rounded exterior edges, said connectors further having sides which are inclined at an angle of approximately 5 to 30 degrees, whereby said connectors are configured to reduce snagging.

* * * * *